(12) United States Patent
Dearth

(10) Patent No.: US 10,167,822 B2
(45) Date of Patent: Jan. 1, 2019

(54) DUAL FUEL REFUELING

(71) Applicant: Ford Global Technologies, LLC, Dearborn, MI (US)

(72) Inventor: Mark Allen Dearth, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/008,289

(22) Filed: Jun. 14, 2018

(65) Prior Publication Data

US 2018/0291847 A1 Oct. 11, 2018

Related U.S. Application Data

(62) Division of application No. 14/275,596, filed on May 12, 2014, now Pat. No. 10,066,585.

(51) Int. Cl.

| *F02M 69/04* | (2006.01) |
|---|---|
| *F02M 33/00* | (2006.01) |
| *F02D 19/10* | (2006.01) |
| *F02D 19/06* | (2006.01) |
| *F02M 21/02* | (2006.01) |
| *F17C 1/00* | (2006.01) |

(52) U.S. Cl.
CPC ......... *F02M 33/00* (2013.01); *F02D 19/0647* (2013.01); *F02D 19/0671* (2013.01); *F02D 19/10* (2013.01); *F02M 21/0218* (2013.01); *F17C 1/00* (2013.01); *Y02T 10/32* (2013.01); *Y02T 10/36* (2013.01)

(58) Field of Classification Search
CPC .... F02M 33/00; F02M 21/0218; F02D 19/10; F02D 19/0647; F02D 19/0671; F17C 1/00; Y02T 10/32; Y02T 10/36
See application file for complete search history.

(56) References Cited

U.S. PATENT DOCUMENTS

| 5,117,802 | A | 6/1992 | Durbin |
|---|---|---|---|
| 5,816,224 | A | 10/1998 | Welsh et al. |
| 6,584,780 | B2 | 7/2003 | Hibino et al. |
| 8,342,158 | B2 | 1/2013 | Ulrey et al. |
| 9,255,829 | B2 | 2/2016 | Leone et al. |
| 9,527,718 | B2 * | 12/2016 | Leone .................. B67D 7/0478 |
| 9,679,331 | B2 | 6/2017 | Gottlieb |
| 2003/0094002 | A1 | 5/2003 | Hibino et al. |
| 2012/0060935 | A1 * | 3/2012 | Carter ................ F02M 21/0212 137/14 |

(Continued)

OTHER PUBLICATIONS

Buckley, D., "Solubilities & diffusivities of methane in normal paraffins," Master's Thesis, University of Ottawa, Available Online at https://ruor.uottawa.ca/bitstream/10393/7339/1/MK09886.PDF, Jan. 1971, 109 pages.

(Continued)

*Primary Examiner* — Hung Q Nguyen
(74) *Attorney, Agent, or Firm* — Julia Voutyras; McCoy Russell LLP

(57) ABSTRACT

Embodiments are disclosed that relate to refueling a dual fuel internal combustion engine. In one example, a method comprises supplying a liquid fuel to a fuel tank configured to store both the liquid fuel and a gaseous fuel, if a pressure in the fuel tank is less than a threshold pressure.

8 Claims, 6 Drawing Sheets

(56) References Cited

U.S. PATENT DOCUMENTS

2013/0000607 A1    1/2013    Watanabe

OTHER PUBLICATIONS

Polishuk, I. et al., "Simultaneous prediction of the critical and sub-critical phase behavior in mixtures using equations of state III. Methane-n-alkanes," Chemical Engineering Science, vol. 58, No. 19, Oct. 2003, Published Online Aug. 5, 2003, 14 pages.

* cited by examiner

US 10,167,822 B2
DUAL FUEL REFUELING

CROSS REFERENCE TO RELATED APPLICATION

The present application is a divisional of U.S. patent application Ser. No. 14/275,596, entitled "DUAL FUEL REFUELING," filed on May 12, 2014. The entire contents of the above-referenced application are hereby incorporated by reference in its entirety for all purposes.

FIELD

The field of the disclosure relates to dual fuel internal combustion engines.

BACKGROUND AND SUMMARY

Compressed natural gas (CNG) is a high octane fuel that is beneficial for reducing engine knock, hydrocarbon emissions in cold start events, and carbon dioxide emissions during engine operation. However, CNG has a low energy density compared to liquid hydrocarbon fuels, such as diesel fuel or gasoline. To increase the range and total fuel quantity stored in a vehicle, CNG may be utilized in conjunction with gasoline or diesel fuel, requiring the vehicle to switch between fuels for optimal performance. To facilitate the consumption of both gaseous and liquid fuels, two separate fuel tanks may be included in the vehicle to store the gaseous and liquid fuels, respectively.

The inventors herein have recognized several issues with the above approach. Namely, the use of two separate fuel tanks that respectively store gaseous and liquid fuels increases vehicle weight, packaging space, complexity of fuel storage and injection, and reduces fuel economy. These issues are exacerbated for light duty vehicles.

One approach that at least partially addresses the above issues includes a method of refueling comprising supplying a liquid fuel to a fuel tank configured to store both the liquid fuel and a gaseous fuel, if a pressure in the fuel tank is less than a threshold pressure.

In a more specific example, liquid fuel is supplied to the fuel tank if the liquid fuel is sensed in a surge tank configured to store the liquid fuel, the surge tank fluidly coupled to the fuel tank and positioned upstream of the fuel tank.

In another aspect of the example, vapor from the fuel tank is pumped to a secondary tank if the pressure in the fuel tank is greater than the threshold pressure.

In this way, a vehicle may be supplied and refueled with two different fuels by using a single fuel tank to store the fuels, reducing vehicle weight, packaging space, complexity of fuel storage and injection, and increasing fuel economy. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
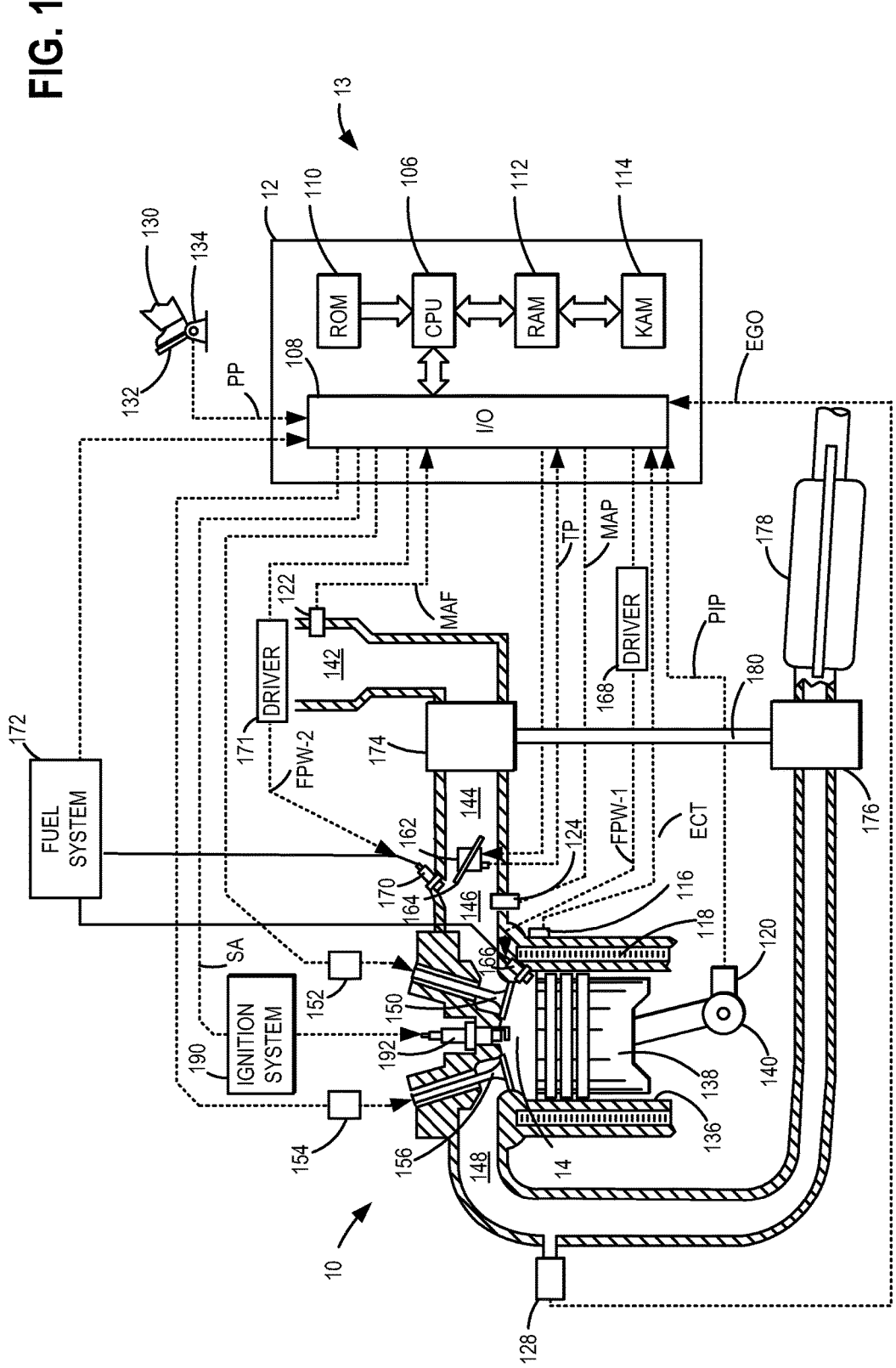
FIG. 1 schematically depicts an example cylinder of an internal combustion engine.
Figure 2:
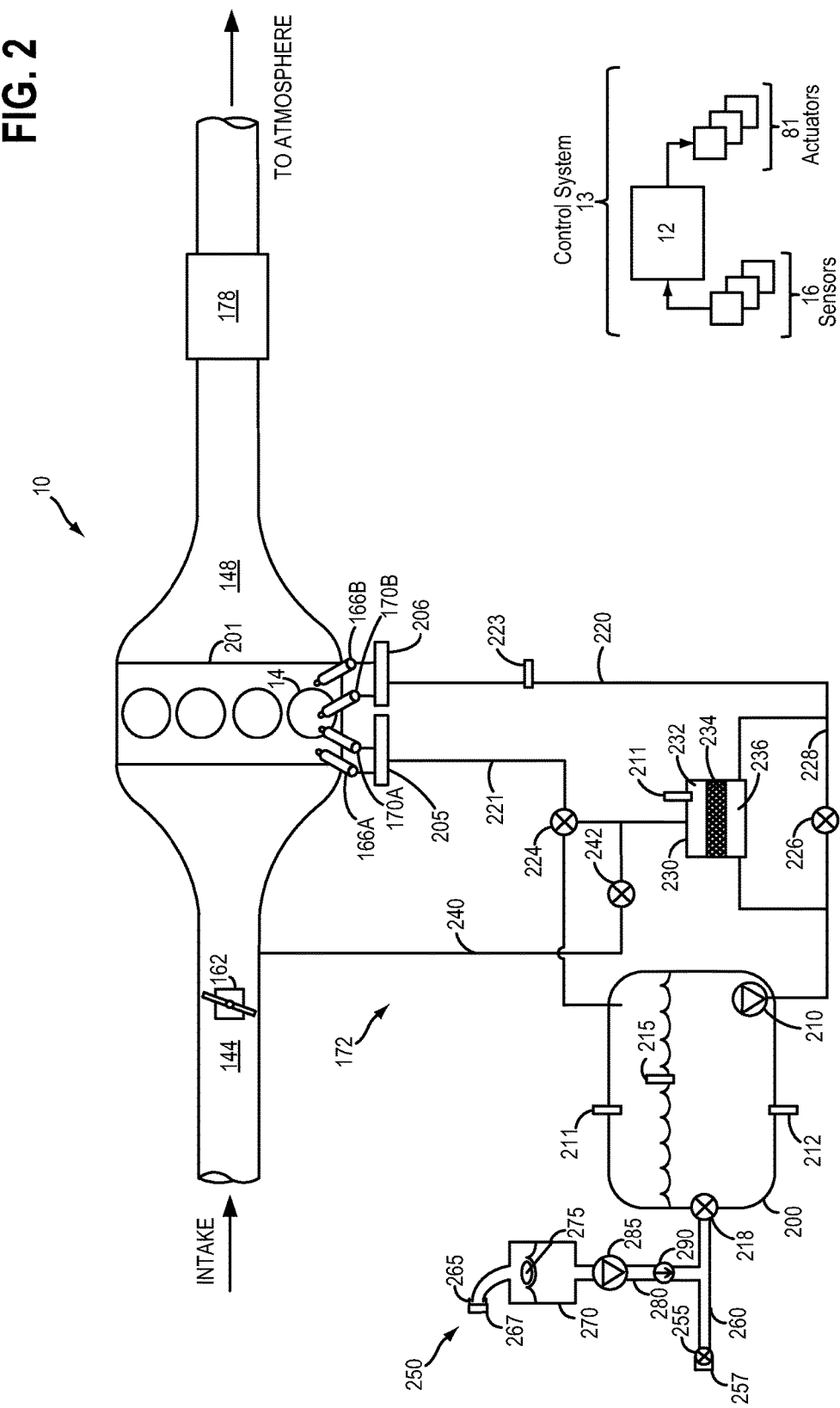
FIG. 2 shows a schematic depiction of the engine of FIG. 1 and a fuel system configured to operate on a mix of gaseous fuel and liquid fuel.
Figure 3:
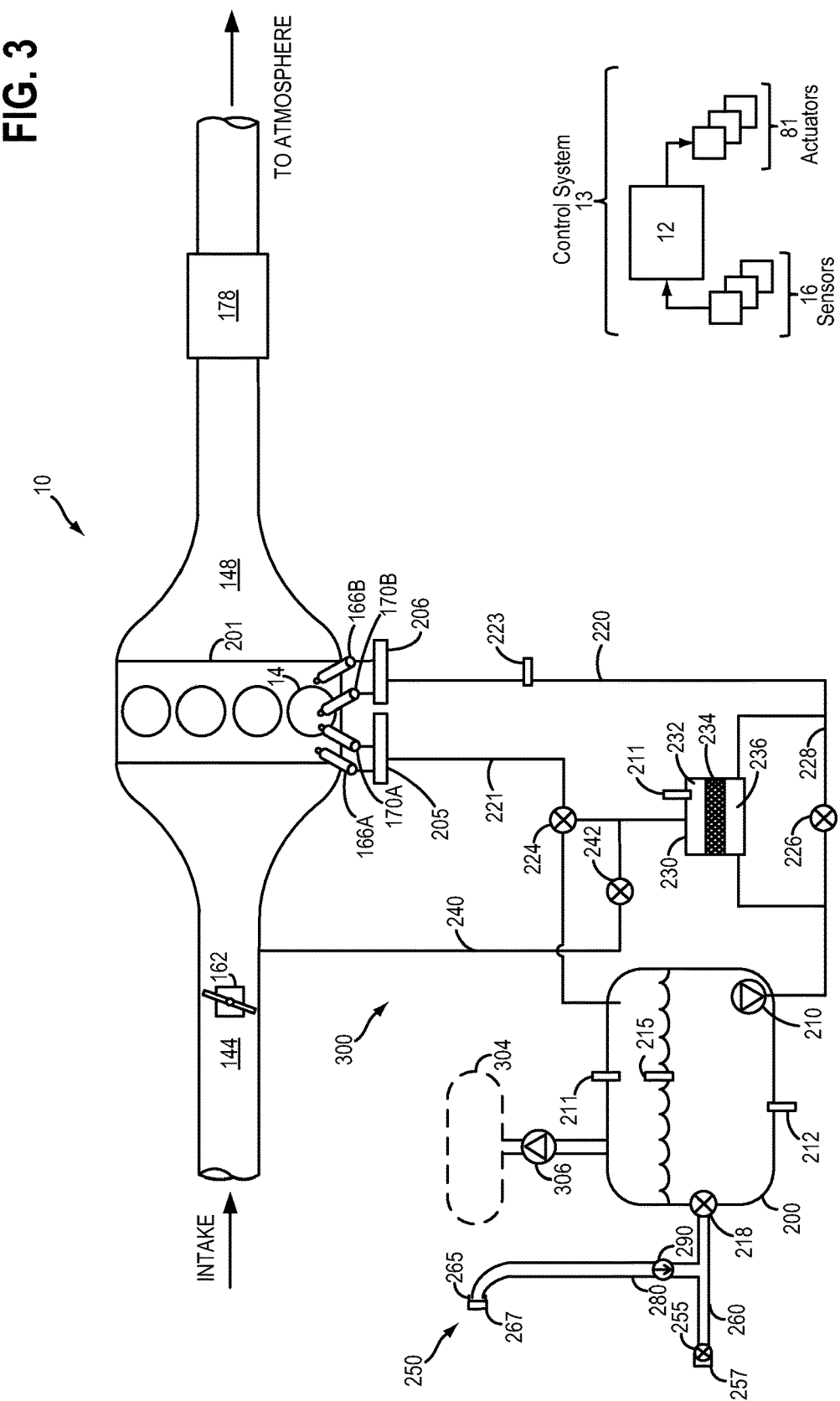
FIG. 3 shows a schematic depiction of the engine of FIG. 1 and another fuel system configured to operate on a mix of gaseous fuel and liquid fuel.
Figure 4:
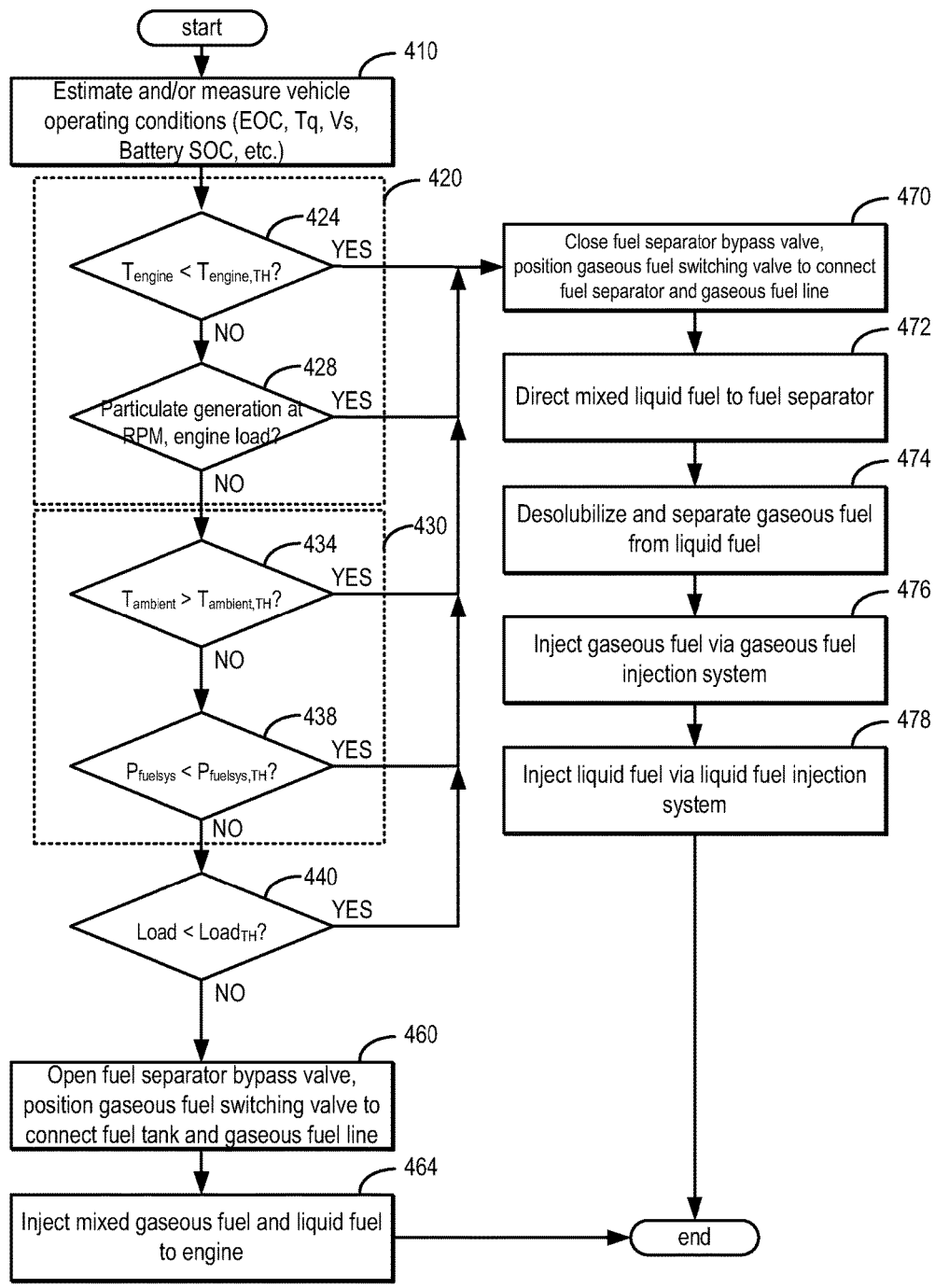
FIG. 4 shows a flowchart illustrating an exemplary method for operating the engine and fuel system of FIGS. 1-3.
Figure 5:
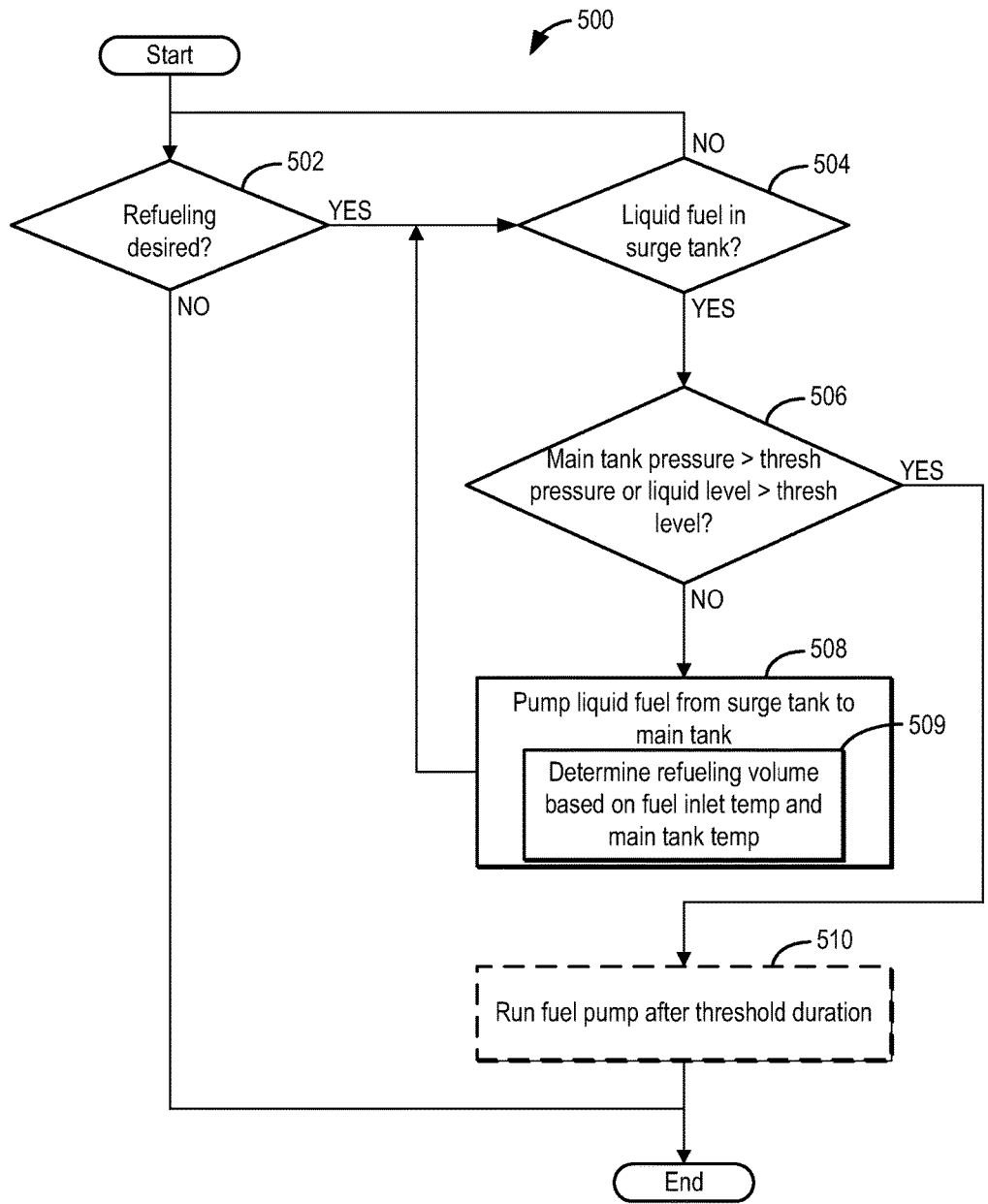
FIG. 5 shows a flowchart illustrating an exemplary method for refueling the fuel system of FIG. 2.
Figure 6:
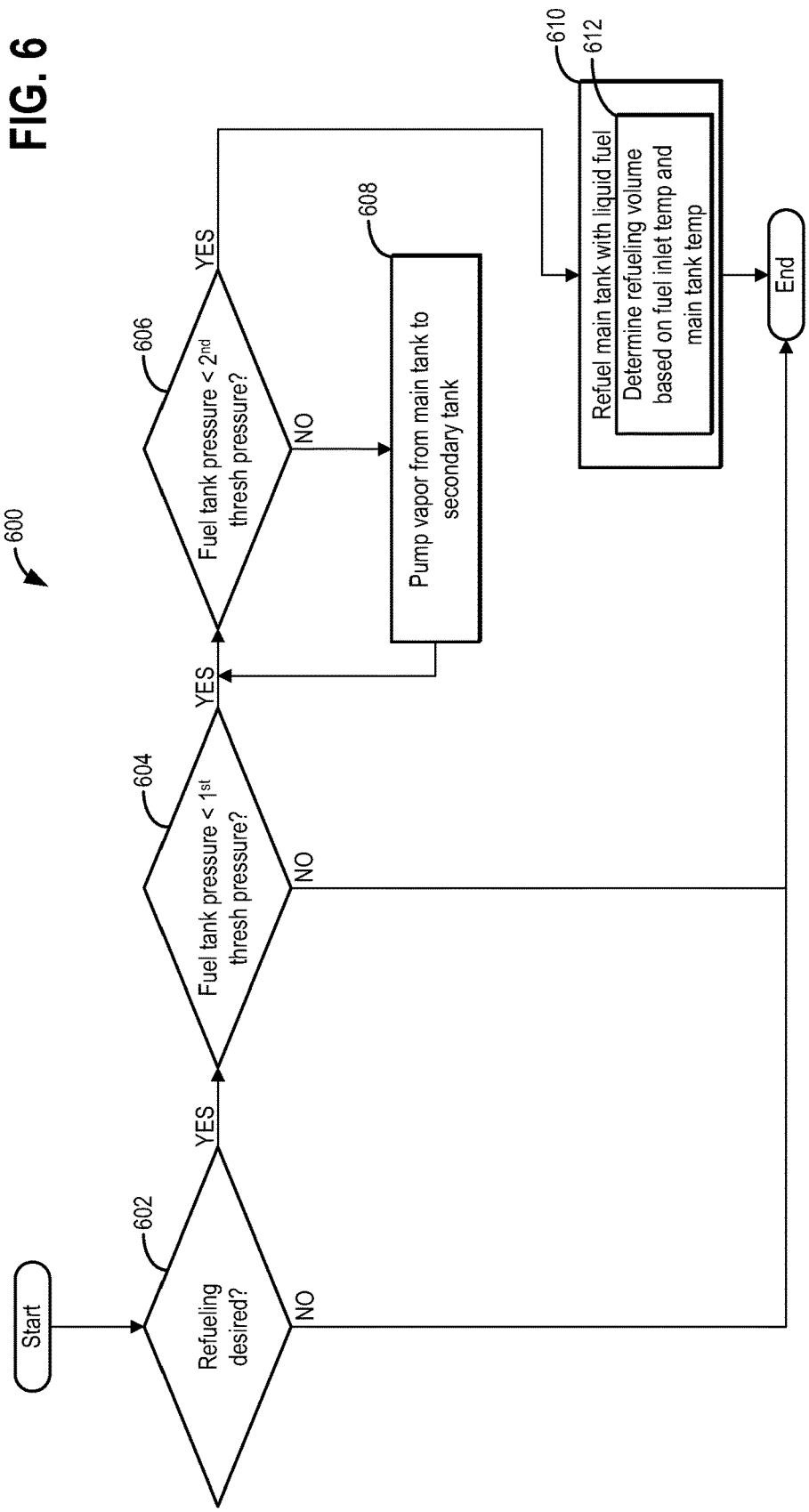
FIG. 6 shows a flowchart illustrating an exemplary method for refueling the fuel system of FIG. 3.

A key physical property of natural gas (e.g., methane) is its solubility in hydrocarbons. This property can be utilized to store both liquid hydrocarbon fuels (e.g., gasoline, diesel, etc.) and compressed natural gas (CNG) in a single fuel tank. By varying the pressure of the fuels, the admixture may be separated into its constituent gaseous and liquid components for discrete consumption. The present description relates to systems and methods for refueling such a fuel tank. FIG. 1 schematically depicts an example cylinder of an internal combustion engine, FIG. 2 shows a schematic depiction of the engine of FIG. 1 and a fuel system configured to operate on a mix of gaseous fuel and liquid fuel, FIG. 3 shows a schematic depiction of the engine of FIG. 1 and another fuel system configured to operate on a mix of gaseous fuel and liquid fuel, FIG. 4 shows a flowchart illustrating an exemplary method for operating the engine and fuel system of FIGS. 1-3, FIG. 5 shows a flowchart illustrating an exemplary method for refueling the fuel system of FIG. 2, and FIG. 6 shows a flowchart illustrating an exemplary method for refueling the fuel system of FIG. 3. The engine of FIG. 1 also includes a controller to carry out the methods depicted in FIGS. 4-5.

FIG. 1 depicts an example embodiment of a combustion chamber or cylinder of internal combustion engine 10. Engine 10 may be controlled at least partially by a control system 13, including controller 12, and by input from a vehicle operator 130 via an input device 132. In one example, input device 132 includes an accelerator pedal and a pedal position sensor 134 for generating a proportional pedal position signal PP. Cylinder (e.g., combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may aid in mixing and combustion when operating the engine with an alcohol-based fuel due to the lower volatility of some alcohol-based fuels. Alternatively, the injector may be located overhead and near the intake valve to aid in mixing of intake air and injected fuel. Fuel may be delivered to fuel injector 166 from fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, although not shown in FIG. 1, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the air intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used. Furthermore the injection ratios may be adjusted based on one or more engine operating conditions such as engine load, engine speed, fuel system pressure, engine temperature, and the like. In this way one or both of liquid and gaseous fuels may be combusted in an engine cylinder.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved. Further still, fuel injectors 166 and 170 may each include one or more gaseous fuel injectors for injecting gaseous fuel, and one or more liquid fuel injectors for injecting liquid fuel.

In some embodiments, fuel system 172 may include a fuel tank that holds a liquid fuel, such as gasoline, and also holds a gaseous fuel, such as CNG. A portion of the gaseous fuel may be solubilized in the liquid fuel. The liquid fuel and the gaseous fuel together may be referred to as a mixed fuel, and the fuel tank may thus store or hold a mixed fuel. In other embodiments, fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. Fuel injectors 166 and 170 may be configured to inject fuel from the same fuel tank, from different fuel tanks, from a plurality of the same fuel tanks, or from an overlapping set of fuel tanks. While FIG. 1 depicts fuel injector 166 as a direct fuel injector and fuel injector 170 as a port fuel injector, in other embodiments both injectors 166 and 170 may be configured as port fuel injectors or may both be configured as direct fuel injectors.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; an exhaust gas oxygen (EGO) signal from exhaust gas sensor 128; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described herein and with regards to FIGS. 4 and 5.

Turning now to FIG. 2, a schematic depiction of engine 10 of FIG. 1 and fuel system 172 configured to operate on a mix of gaseous fuel and liquid fuel is shown. As shown, internal combustion engine 10 includes cylinders 14 coupled to intake passage 144 and exhaust passage 148. Intake passage 144 may include throttle 162. Exhaust passage 148 may include emissions control device 178. Control system 13, including controller 12, may receive signals from various sensors 16, and additional sensors shown in FIGS. 1 and 2, and output signals to various actuators 81, including additional actuators shown in FIGS. 1 and 2.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166A and 166B, and fuel injectors 170A and 170B. Although only one cylinder is shown coupled to fuel injectors, it is to be understood that all cylinders 14 included in cylinder head 201 may also be coupled to one or more fuel injectors. In this example embodiment, fuel injectors 166A and 166B are depicted as a direct fuel injector and fuel injectors 170A and 170B are depicted as a port fuel injector. Although only two direct injectors and two port injectors are shown in FIG. 2, it is to be understood that engine 10 may comprise more than two direct injectors and more than two fuel injectors. Each fuel injector may be configured to deliver a specific quantity of gaseous and/or liquid fuel at a specific time point in the engine cycle in response to commands from controller 12. In some examples, fuel injectors 170A and 170B may be used to inject a gaseous fuel such as CNG, while in other examples fuel injectors 166A and 166B may be used to inject gaseous fuel. In the latter example in which fuel injectors 166A and 166B are used to inject gaseous fuel, liquid fuel such as gasoline or diesel may be injected via fuel injectors 166A and 166B as well, though embodiments in which fuel injectors 170A and 170B are used to inject liquid fuel in combination with direct injection of the gaseous fuel are also contemplated. One or more fuel injectors may be utilized to deliver combustible fuel to cylinder 14 during each combustion cycle. The timing and quantity of fuel injection may be controlled as a function of engine operating conditions.

Fuel system 172 includes fuel tank 200. Fuel tank 200 may include a liquid fuel, such as gasoline, diesel fuel, or a gasoline-alcohol blend (e.g. E10, E85, M15, or M85), and may also include a gaseous fuel, such as CNG. Fuel tank 200 may be configured to store liquid fuel and gaseous fuel together at a relatively low pressure compared to conventional CNG storage (e.g. 200-250 atmospheres). For example, the gaseous fuel may be added to a pressure of 100 atmospheres. In this way, a portion of the gaseous fuel may be dissolved in the liquid fuel. At 100 atmospheres, CNG may dissolve in gasoline to the point where 40% of the liquid fuel component in fuel tank 200 is CNG. Fuel tank 200 may include pressure sensor 211, temperature sensor 212, and liquid level sensor 215 (e.g., a float sensor).

Liquid fuel and/or gaseous fuel may be supplied from fuel tank 200 to cylinders 14 of engine 10 via liquid fuel line 220 and gaseous fuel line and 221, fuel rails 205 and 206 and fuel injectors 166A, 166B, 170A, and 170B. In one example, gaseous fuel may be delivered from fuel tank 200 by positioning three-way gaseous fuel switching valve 224 to fluidly couple fuel tank 200 to gaseous fuel line 221 and gaseous fuel rail 205. Gaseous fuel delivered to gaseous fuel rail 205 may be port fuel injected to cylinder 14 by gaseous fuel injector 170B, and may be directly injected to cylinder 14 by liquid fuel injector 170A. Liquid fuel, including solubilized gaseous fuel in the liquid fuel, may be supplied from fuel tank 200 by operating fuel lift pump 210. Liquid fuel line 220 may be coupled to a lower portion of fuel tank 200 in order draw liquid fuel from fuel tank 200 via fuel lift pump 210. In some cases, fuel lift pump 210 may be omitted from fuel system 172. In such embodiments, the pressure of gaseous fuel stored in fuel tank 200 may be used to drive liquid fuel from fuel tank 200 to fuel rail 205 via fuel line 220. In embodiments where fuel lift pump 210 is omitted, an additional liquid fuel valve may be coupled to fuel line 220 to control liquid fuel flow through fuel line 220. If fuel separator bypass valve 226 is open, liquid fuel may be delivered via bypass fuel line 228 to liquid fuel line 220 and liquid fuel rail 206, where liquid fuel may be directly injected into cylinder 14 via liquid fuel injector 166A and/or port fuel injected into cylinder 14 liquid fuel injector 166B.

In one example, gaseous fuel rail 205 may comprise a DI gaseous fuel rail for direct injecting gaseous fuel via one or more DI gaseous fuel injectors 170A and a PFI gaseous fuel rail for port injection of gaseous fuel via one or more PFI liquid fuel injectors 170B. In other examples, only a DI gaseous or only a PFI gaseous injection system may be used. Furthermore, liquid fuel rail 206 may comprise a DI liquid fuel rail for direct injecting liquid fuel via one or more DI liquid fuel injectors 166A and a PFI liquid fuel rail for port injection of liquid fuel via one or more PFI liquid fuel injectors 166B. In other examples, only a DI liquid or only a PFI liquid fuel injection system may be used. Further still, a DI gaseous fuel pump may be provided upstream of DI gaseous fuel rail and downstream of gaseous fuel switching valve 224 for delivering pressurized gaseous fuel to DI gaseous fuel rail. Further still, a DI liquid fuel pump may be provided upstream of DI liquid fuel rail and downstream of bypass fuel line 228 for delivering pressurized liquid fuel to DI liquid fuel rail. Further still, a single DI fuel pump may be used to deliver both gaseous fuel and liquid fuel. Although not shown in FIG. 2, DI liquid fuel pump may be a high pressure fuel pump comprising a solenoid activated inlet check valve, a piston, and an outlet check valve for delivering high pressure liquid fuel to DI liquid fuel rail. Injection of liquid fuel via DI liquid fuel injection pump may lubricate the piston of liquid DI fuel pump, thereby reducing pump wear and degradation and reducing pump NVH.

If fuel separator bypass valve 226 is closed, liquid fuel supplied from fuel tank 200 may be delivered to fuel separator 230. As an example, fuel separator 230 may comprise a coalescer or other known processing unit for separating liquids and gases. Fuel separator 230 may comprise a coalescing filter 234, and an expansion chamber 232 on a downstream side thereof and a sump chamber 236 on an upstream side thereof. Liquid fuel may be supplied to the sump chamber 236 and/or the coalescing filter 234 at a fuel pressure of fuel lift pump 210. A pressure differential may be maintained across coalescing filter 234 wherein a pressure in expansion chamber 232 may be less than the fuel pressure in the sump chamber 236. For example, the pressure differential may be maintained by controlling lift pump 210 to supply sufficient pressure. Furthermore, coalescing filter may comprise a fritted filter, such as a steel fritted filter. Expansion chamber 232 may also be described as a manifold chamber.

In one example, the pressure differential may be maintained across coalescing filter 234 by a check valve 242 positioned downstream of the fuel separator 230 and fluidly coupled to the expansion chamber 232 via a gaseous fuel relief passage 240. The check valve 242 may be configured to open when a pressure upstream of the check valve exceeds a threshold pressure, for example, an intake manifold pressure. The outlet of the check valve 242, via the gaseous fuel relief passage 240, may be fluidly coupled to the intake manifold and/or a positive crankcase ventilation (PCV) system of engine 10. In this way, separated gaseous fuel may be supplied to the intake manifold and/or the engine crankcase where it may be used to aid in reducing oil viscosity and in lubricating the engine components.

For example, a pressure in the expansion chamber 232 may be less than a threshold pressure. The pressure in expansion chamber 232 may be measured by pressure sensor 238 and communicated to controller 12. In one example, the threshold pressure may comprise a pressure less than 100 psi. Below 100 psi, the solubility of CNG, methane, and other gaseous fuels may be reduced such that an amount of solubilized gaseous fuel in the liquid fuel may be very low. For example, the solubility of gaseous fuel (volume gaseous fuel dissolved per volume of liquid fuel) may be approximately 1 mL/mL per atmospheres of gaseous fuel pressure. Accordingly, upon entering the fuel separator 230, gaseous fuel solubilized in the liquid fuel may be desolubilized and volatilized from the liquid fuel, and may be conveyed across the coalescing filter 234 into the expansion chamber 232 and out of fuel separator 230 towards gaseous fuel switching valve 224. Furthermore, positioning the three-way gaseous fuel switching valve 224 to fluidly connect the fuel separator 230 to gaseous fuel rail 205 may supply the desolubilized gaseous fuel to gaseous fuel rail 205. Subsequently, desolubilized gaseous fuel may be injected to cylinder 14 via gaseous fuel injectors 170A and 170B.

Volatilization of the gaseous fuel from the liquid fuel may decrease the liquid and gaseous fuel temperatures and may cool the coalescing filter 234. Furthermore, the lowered liquid fuel temperature may reduce the volatility of the liquid fuel so that entrainment of lighter hydrocarbon fuel components into the desolubilized gaseous fuel stream may be reduced. Any entrained hydrocarbon components in the liquid fuel, such as residual butanes, pentanes, and hexanes, may volatilize and be entrained by the desolubilized gaseous fuel in the fuel separator. Accordingly, the octane value of the liquid fuel may thus be slightly raised, while the octane value of the gaseous fuel may be slightly reduced. Furthermore, recompression of the gaseous fuel downstream of the fuel separator may condense these residual hydrocarbon components.

Liquid fuel delivered to the fuel separator 230 may flow through sump chamber 236 and out of fuel separator 230 towards bypass fuel line 228 and liquid fuel line 220. A portion of liquid fuel delivered to fuel separator 230 may condense as droplets on and within coalescing filter 234. As the droplets of liquid fuel flow through the coalescing filter 234, they may merge and coalesce, thereby forming larger droplets, which may be conveyed by gravity back to the sump chamber 236.

Although in FIG. 2, the sump chamber 236, coalescing filter 234, and expansion chamber 232 are illustrated as being arranged in a linear fashion, other arrangements may also be included. For example, the sump chamber 236, coalescing filter 234, and expansion chamber 232 may be arranged in a concentric configuration wherein the expansion chamber is encircled by the coalescing filter 234 and the sump chamber 236, and wherein the fuel flowing into and out of the fuel separator 230 flows in an axial and/or radial direction with respect to the concentric configuration. Furthermore, sump chamber 236 may be fluidly connected to expansion chamber 232 via coalescing filter 234.

In this way, solubilized gaseous fuel in the liquid fuel may be desolubilized and separated from the liquid fuel before injection of liquid fuel into cylinder 14. Furthermore, gaseous fuel may be injected separately from liquid fuel to cylinder 14 via gaseous fuel injectors 170A and 170B. In other words, gaseous fuel may be injected only via gaseous fuel injectors and liquid fuel may be injected only via liquid fuel injectors. Furthermore, only gaseous fuel may be injected by switching off liquid fuel injection, or only liquid fuel may be injected by switching off gaseous fuel injection. Gaseous fuel may comprise one or more of compressed natural gas (CNG), methane, propane, and butane as non-limiting examples, while liquid fuel may comprise one or more of gasoline, alcohol, and diesel fuel, as non-limiting examples.

Fuel system 172 is shown coupled to refueling system 250. Refueling system 250 may be coupled to fuel tank 200 via tank access valve 218. Tank access valve 218 may be coupled to refueling conduit 260. Refueling conduit 260 may include high pressure refueling port 255. High pressure refueling port 255 may be configured to receive a pressurized gaseous fuel pump nozzle, or a fuel pump nozzle configured to deliver a pre-pressured mixture of liquid fuel and gaseous fuel. In some cases, a second high pressure refueling port may be included to allow compatibility with more than one type of high pressure fuel pump nozzle—for example, a first refueling port may be configured to receive a pressurized mixture of liquid fuel and gaseous fuel, and a second refueling port may be configured to receive the gaseous fuel.

Access to high pressure refueling port 255 may be regulated by refueling lock 257. In some embodiments, refueling lock 257 may be a fuel cap locking mechanism. The fuel cap locking mechanism may be configured to automatically lock a fuel cap in a closed position so that the fuel cap cannot be opened. For example, the fuel cap may remain locked via refueling lock 257 while pressure in the fuel tank is greater than a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 257 may be a filler pipe valve located at a mouth of refueling conduit 260. In such embodiments, refueling lock 257 may prevent the insertion of a refueling pump into refueling conduit 260. The filler pipe valve may be electrically locked, for example by a solenoid, or mechanically locked, for example by a pressure diaphragm.

In some embodiments, refueling lock 257 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 257 is locked using an electrical mechanism, refueling lock 257 may be unlocked by commands from controller 12. In embodiments where refueling lock 257 is locked using a mechanical mechanism, refueling lock 257 may be unlocked via a pressure gradient.

Refueling conduit 260 may be coupled to low pressure refueling conduit 280. Low pressure refueling conduit 280 may be coupled to surge tank 270. Surge tank 270 may include a low pressure refueling port 265 and a liquid sensor 275. Low pressure refueling conduit 280 may include fuel pump 285 and check valve 290. Fuel pump 285 may only operate when fuel tank pressure is below a threshold, and may only operate when there is liquid fuel in surge tank 270, as sensed by liquid sensor 275. In this way, fuel pump 285 may not pump an air/fuel mixture into fuel tank 200. Further, when fuel tank pressure reaches a threshold, fuel pump 285 may be shut off by controller 12, causing liquid fuel to accumulate in surge tank 270. This may cause a low pressure liquid fuel dispenser nozzle engaged with low pressure refueling port 265 to turn itself off. Access to refueling port 265 may be regulated by refueling lock 267. Refueling lock 267 may comprise one of the examples described for refueling lock 257. Refueling locks 257 and 267 may further comprise different mechanisms.

Fuel system 172 may allow unpressurized liquid fuel (e.g., gasoline, diesel, alcohol, etc.), pressurized gaseous fuel (e.g., CNG), and/or a pressurized mixture of liquid and gaseous fuel (e.g., gasoline and CNG, diesel and CNG, etc.) to be added to fuel tank 200 as desired, as long as pressure in the fuel tank is less than a maximum allowable pressure. Addition of pressured fuel in particular does not require an active control mechanism. When liquid is sensed inside surge tank 270, fuel pump 285 may be used to pump the liquid fuel into the tank if the tank pressure is less than the maximum allowable pressure. Liquid sensor 275 may be used to avoid pumping air into tank 270 and to avoid creation of a combustible mixture inside the tank. When tank 270 is full (e.g., with respect to pressure or liquid level), fuel pump 285 stops, liquid fuel fills surge tank 270, and a liquid fuel dispenser nozzle may shut itself off. In some examples, control logic may be employed to reduce evaporative emissions from surge tank 270 by running fuel pump 285 at a later time. FIG. 5 shows a flowchart illustrating an exemplary method 500 that may be used to refuel fuel tank 200 via fuel system 172.

As described above, in some embodiments fuel system 172 may include two high pressure refueling ports. In this example, a first high pressure refueling port may be configured to receive a pre-pressurized mixture of liquid fuel and gaseous fuel, and a second high pressure refueling port may be configured to receive the gaseous fuel. The nozzle/port design utilized by the first high pressure refueling port may differ from that utilized by the second high pressure refueling port so that the correct fuel(s) are supplied to the corresponding port, for example.

Turning now to FIG. 3, a schematic depiction of engine 10 of FIG. 1 and a fuel system 300 configured to operate on a mix of gaseous fuel and liquid fuel is shown. As fuel system 300 may be considered a modification of fuel system 172, like reference numerals are used where appropriate, with their functionality being understood from the description above.

Unlike fuel system 172, fuel system 300 lacks a surge tank and fuel pump at low pressure refueling port 265. As such, the addition of liquid fuel may be carried out when the pressure in fuel tank 200 is approximately zero. To depressurize main tank 200, substantially all (e.g., 90% or more) of the solubilized gaseous fuel in the main tank may be drawn to and consumed by engine 10. Alternatively or additionally, a mechanism may be provided by which main tank 200 may be depressurized by venting solubilized gaseous fuel to the atmosphere or to a separate tank not shown in FIG. 3. In these embodiments, refueling may be performed without active control mechanism: if a substantially non-zero pressure (e.g., atmospheric or greater pressure) exists in main tank 200, check valve 290 may allow liquid fuel to fill low pressure refueling port 265 and a low pressure liquid fuel dispenser nozzle may automatically shut itself off.

FIG. 3 also shows a secondary tank 304 and a pump 306 that may be optionally included in fuel system 300 in some embodiments. Secondary tank 304 is fluidly coupled to main tank 200 so that the main tank may be actively depressurized to allow refueling with low pressure liquid fuel. Control logic may be employed to determined, based on a first threshold, whether the pressure in main tank 200 may be reduced by pumping vapors from the main tank into secondary tank 304. The control logic may also determine, based on a second threshold less than the first threshold, whether main tank 200 has been depressurized via vapor pumping to secondary tank 204 to an extent such that low pressure refueling port 265 may be opened. FIG. 6 shows a flowchart illustrating an exemplary method 600 for refueling tank 200 via fuel system 300.

Turning now to FIG. 4, a flowchart illustrating an exemplary method 400 for operating an engine and a fuel system is shown. Method 400 may be employed for operating engine 10 of FIG. 1 and one or both of fuel systems 172 and 300 of FIGS. 2 and 3, respectively, for example. Method 400 begins at 410 where engine operating conditions such as engine on condition (EOC), engine temperature, fuel system pressure, engine torque, engine load, engine speed (RPM) and the like are measured and/or estimated. Method 400 continues at 420 where it determines if engine operating conditions may increase generation of particulate emissions. At 424, method 400 determines if an engine temperature, $T_{engine}$, is less than a threshold engine temperature, $T_{engine,TH}$. If $T_{engine} < T_{engine,TH}$, liquid fuel droplets may fail to evaporate when striking metal surfaces of the engine and may thereby increase generation of particulate emissions. If $T_{engine}$ is not less than $T_{engine,TH}$, method 400 continues at 428 where particulate generation is determined based on an engine speed and load. As an example, method 400 may reference a look-up table of predetermined engine speed and load to determine if particulate emissions may increase at the current engine speed and load conditions. If method 400 determines that particulate emissions may not increase or are low at the current engine speed and load, method 400 continues at 430.

At 430, method 400 determines if a gaseous fuel bubble formation may occur in the fuel system. At 434, method 400 determines if an ambient temperature, $T_{ambient}$, is greater than a threshold ambient temperature, $T_{ambient,TH}$. $T_{ambient}$ may also refer to a measured or estimated under-hood temperature or a fuel system temperature, as described above. If $T_{ambient} > T_{ambient,TH}$ gaseous fuel bubbles may be generated during fuel delivery to the engine, and fuel delivery reliability and robustness may be reduced. In one example, a fuel delivery volumetric flow rate may be lowered because of the expansion of gaseous fuel bubbles in a liquid fuel line. In another example, formation of gaseous fuel bubbles may cause cavitation in a liquid fuel line or at a DI fuel pump, reducing fuel delivery reliability and decreasing engine operability. In yet another example, fuel bubbles may affect fuel metering with fuel injectors, thus changing air/fuel ratio and degrading engine emissions. If $T_{ambient}$ is not greater than $T_{ambient,TH}$, method 400 continues at 438 where it determines if a fuel system pressure, $P_{fuelsys}$, is less than a threshold fuel system pressure, $P_{fuelsys,TH}$. If $P_{fuelsys} < P_{fuelsys,TH}$, gaseous fuel bubbles may be generated during fuel delivery to the engine, and fuel delivery reliability and robustness may be reduced. As described above, $P_{fuelsys}$ may be determined from one or more pressure sensors positioned at fuel system 172 and/or 300. For example, with reference to FIG. 2, fuel system pressure may be measured by one or more of pressure sensor 211 at fuel tank 200, pressure sensor 238 at fuel separator 230, pressure sensor 223 in liquid fuel line 220, and a pressure sensor in either of gaseous fuel rail 205 or liquid fuel rail 206.

If at 438, $P_{fuelsys} < P_{fuelsys,TH}$, method 400 continues at 440 where it determines if an engine load is less than a threshold engine load, $Load_{TH}$. Injection of gaseous fuel (especially via port fuel injection) may displace intake air in the engine cylinder or the engine intake air passage 146. As such, at high engine loads above $Load_{TH}$, displacing engine intake air may reduce available engine torque and decrease drivability and solubilized gaseous fuel may not be separated from liquid fuel to enable injection of solubilized gaseous fuel in liquid fuel. If engine load is not less than $Load_{TH}$, method 400 continues at 460, where it opens the fuel separator bypass valve 226 thereby directing the solubilized gaseous fuel and liquid fuel to bypass fuel line 228 and liquid fuel line 220. Furthermore, method 400 may position gaseous fuel switching valve 224 to fluidly connect fuel tank 200 with gaseous fuel line 221. Next, at 464, the mixture of solubilized gaseous fuel and liquid fuel may be injected via liquid fuel rail 206 and liquid fuel injectors 166A and 166B to the engine. Because method 400 determines that engine operating conditions are not conducive to generation of particulate emissions at 420, and are not conducive to generation of gaseous fuel bubbles at 430, the mixture of solubilized gaseous fuel and liquid fuel may be injected to the engine while maintaining fuel delivery reliability and robustness. After 464, method 400 ends.

If at 424 $T_{engine} < T_{engine,TH}$, at 428 particulate generation may increase, at 434 $T_{ambient} > T_{ambient,TH}$, at 438

$P_{fuelsys} < P_{fuelsys,TH}$, or at 440 engine load<Load$_{TH}$, method 400 proceeds to desolubilize and separate the gaseous fuel from the liquid fuel. At 470, method 400 closes the fuel separator bypass valve and positions gaseous fuel switching valve 224 to connect fuel separator 230 and gaseous fuel line 221. Next, at 472, method 400 directs the solubilized gaseous fuel and the liquid fuel to the fuel separator 230, for example, via fuel lift pump 210. Alternately, the pressure in fuel tank 210 may convey fuel from fuel tank 210. At 474, the gaseous fuel is desolubilized and separated from the liquid fuel in fuel separator 230. As an example, a pressure differential across coalescing filter 234 may desolubilize the gaseous fuel, whereby the gaseous fuel flows across the coalescing filter 234 to expansion chamber 232, and out of fuel separator 230 through gaseous fuel switching valve 224 to gaseous fuel line 221. As an example, a pressure in the expansion chamber may be less than a threshold pressure, for example less than 100 psi, in order to readily desolubilize the gaseous fuel from the liquid fuel. Liquid fuel droplets may condense on coalescing filter 234 where they may coalesce and then drop back to the sump chamber 236 where most of the liquid fuel collects before flowing out of fuel separator 230 to liquid fuel bypass line 228 and liquid fuel line 220. After the gaseous fuel and liquid fuel are separated in fuel separator 230, the gaseous fuel and the liquid fuel may be separately injected to the engine via the gaseous fuel injection system and the liquid fuel injection system at 476 and 478, respectively. Method 400 ends following 476 and 478.

Turning now to FIG. 5, a flowchart illustrating an exemplary method 500 for refueling a fuel system having a main fuel tank configured to store both a liquid fuel and a gaseous fuel. Method 500 may be used to refuel fuel tank 200 via fuel system 172 of FIG. 2, for example.

At 502 of method 500, it is determined whether refueling of the main fuel tank is desired. A desire to refuel the main fuel tank may be indicated in various suitable manners. For example, a vehicle operator may request refueling via a suitable interface. Alternatively or additionally, opening of an outer door of a refueling port upstream of the main fuel tank may indicate a desire to refuel. As another example, vehicle proximity to a refueling station may indicate a desire to refuel. Vehicle proximity may be determined by various suitable mechanisms such as the GPS system described above or via location data obtained in a different manner— for example, via direct communication between the vehicle and the refueling station. If it is determined that main fuel tank refueling is not desired (NO), method 500 ends. If it is determined that main fuel tank refueling is desired (YES), method 500 proceeds to 504.

At 504 of method 500, it is determined whether there is liquid fuel present in a surge tank (e.g., surge tank 270 of FIG. 2) of the fuel system. A liquid level sensor such as a float sensor (e.g., float sensor 215 of FIG. 2) positioned in the surge tank may be used to determine whether liquid fuel is present in the surge tank. In some embodiments, liquid fuel levels below a threshold may be treated as if no liquid fuel was present in the surge tank. By detecting the presence of liquid fuel in the surge tank, pumping of air into the main fuel tank may be avoided, in turn avoiding the creation of a combustible fuel mixture inside the main fuel tank. If it is determined that liquid fuel is not present in the surge tank (NO), method 500 returns to 502. If it is instead determined that liquid fuel is present in the surge tank (YES), method 500 proceeds to 506.

At 506 of method 500, it is determined whether the pressure in the main fuel tank exceeds a threshold pressure, or whether a level of liquid fuel in the main fuel tank exceeds a threshold level. Various suitable mechanisms may be employed to measure the pressure and/or liquid level in the main fuel tank—for example, pressure sensor 211 (FIG. 2) and liquid level sensor 215 (FIG. 2) may be used to determine main fuel tank pressure and liquid level, respectively. If it is determined that the pressure in the main fuel tank exceeds the threshold pressure, or that the liquid level in the main fuel tank exceeds the threshold level (YES), method 500 ends, and refueling is disallowed. If it is instead determined that neither the pressure in the main fuel tank exceeds the threshold pressure, or that the liquid level in the main fuel tank exceeds the threshold level (NO), method 500 proceeds to 508.

At 508 of method 500, refueling is allowed and liquid fuel is pumped from the surge tank to the main fuel tank. Fuel pump 285 of FIG. 2 may be used to pump the liquid fuel, for example. Upon initiation of liquid fuel pumping from the surge tank to the main fuel tank at 508, method 500 returns to 504 and conditionally to 506 such that the presence of liquid fuel in the surge tank and main tank pressure and liquid level may be evaluated on an iterative basis to appropriately control liquid fuel pumping. As described above, if liquid fuel is not present in the surge tank as determined at 504, or if the pressure or liquid level in the main fuel tank exceed respective thresholds as determined at 506, method 500 ends and liquid fuel pumping from the surge tank to the main fuel tank ends. Similarly, gaseous refueling of the main fuel tank may be allowed if it is determined that the main fuel tank pressure and liquid level are below their respective thresholds as determined at 506. Allowance of gaseous refueling may include opening refueling lock 257 at high pressure refueling port 255, for example.

Pumping of the liquid fuel from the surge tank to the main fuel tank at 508 may include, at 509, determining a fuel volume with which to refuel the main fuel tank based on a fuel inlet temperature and a main fuel tank temperature. Fuel inlet temperature may be estimated or measured via a temperature sensor positioned at low pressure refueling port 265, while the main fuel tank temperature may be measured via temperature sensor 212, for example. Here, the fuel volume may be determined based on a difference between the fuel inlet temperature and the main fuel tank temperature, and a maximum temperature that may be assumed by the main fuel tank during vehicle operation. Determination of the fuel volume in this manner accounts for pressure increases in the main fuel tank due to temperature increases. Without accounting for such pressure increases, a fuel volume at a relatively cold temperature may be supplied to the main fuel tank and later exceed a maximum allowable pressure in the main fuel tank as the fuel volume heats up. Determination of the fuel volume may include accessing lookup tables that associate fuel inlet temperatures and main fuel tank temperatures with fuel volumes specific to the types of liquid and gaseous fuels being used, and the solubility of the gaseous fuels in the liquid fuels.

Next, at 510 of method 500, the fuel pump may be optionally run after a threshold duration has passed following determination that either the main fuel tank pressure or liquid level in the main tank have exceeded respective thresholds. Here, running the fuel pump after the threshold duration may reduce evaporative emissions from the surge tank. Following 510, method 500 ends.

Turning now to FIG. 6, a flowchart illustrating another exemplary method 600 for refueling a fuel system having a main fuel tank configured to store both a liquid fuel. Method 600 may be used to refuel fuel tank 200 via fuel system 300 of FIG. 3, for example.

At 602 of method 600, it is determined whether refueling of a main fuel tank is desired. As described above with reference to 602 of method 600, a desire to refuel the main tank may be indicated by a vehicle operator request, opening of an outer door of a refueling port, location data indicating proximity of the vehicle to a refueling station, via direct communication between the vehicle and the refueling station, etc. If it is determined that main fuel tank refueling is not desired (NO), method 600 ends. If it is determined that main fuel tank refueling is desired (YES), method 600 proceeds to 604.

At 604 of method 600, it is determined whether the pressure in the main fuel tank is below a first threshold pressure. Pressure sensor 211 of FIG. 2 may be used to measure the main fuel tank pressure, for example. If it is determined that the pressure in the main fuel tank is not below the first threshold pressure (NO), method 600 ends and refueling of the main tank is disallowed. If it is instead determined that the pressure in the main fuel tank is below the first threshold pressure (YES), method 600 proceeds to 606.

At 606 of method 600, it is determined whether the pressure in the main fuel tank is below a second threshold pressure. In this example, the second threshold pressure is less than the first threshold pressure. If it is determined that the pressure in the main fuel tank is not below the second threshold pressure (NO), method 600 proceeds to 608 where vapor is pumped from the main fuel tank to a secondary tank configured to receive vapor from the main fuel tank. With reference to FIG. 3, the vapor may be pumped by pump 306 from fuel tank 200 to secondary tank 304, for example. In this way, the main fuel tank may be refueled for instances in which the main fuel tank pressure is between the first and second threshold pressures by pumping out vapor from the main fuel tank to the secondary tank. Method 600 may be adapted for embodiments in which the fuel system does not include a secondary tank; in this example, the main fuel tank may be depressurized by drawing substantially all of the gaseous fuel in the main fuel tank into the engine, or, in other examples, by venting gaseous fuel to the atmosphere or to another tank should one be available.

If it is instead determined that the pressure in the main fuel tank is below the second threshold pressure (YES), method 600 proceeds to 610 where refueling of the main fuel tank with the liquid fuel is allowed. Refueling at 610 may include indicating to the vehicle operator that refueling is allowed and/or unlocking or opening an access door to a refueling port. Refueling with the gaseous fuel may also be allowed at 610, which may include opening refueling lock 257 at high pressure refueling port 255, for example.

Refueling the main fuel tank with the liquid fuel at 610 may include, at 612, determining a fuel volume with which to refuel the main fuel tank based on a fuel inlet temperature and a main fuel tank temperature. The fuel volume may be determined in the manner described above with reference to 509 of method 500. As described above, determining of the fuel volume may account for pressure increases that may occur as the fuel heats up, and may include accessing lookup tables that associate fuel inlet temperatures and main fuel tank temperatures with fuel volumes specific to the types of liquid and gaseous fuels being used, and the solubility of the gaseous fuels in the liquid fuels. Following 612, method 600 ends.

Thus, as shown and described, methods 500 and 600 may be used to refuel a fuel tank configured to store both liquid and gaseous fuels with the liquid fuel. While the approaches described herein are not limited to any particular type of gaseous or liquid fuel, usage of CNG (e.g., methane) in combination with gasoline in particular may reduce engine knock while extending vehicular range and performance. Methods 400, 500, and 600 may be stored as machine-readable instructions in a storage medium and executed by a logic subsystem—for example, the methods may be stored in RAM 112 of controller 12 and executed by CPU 106.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for supplying a liquid fuel and a gaseous fuel to an internal combustion engine, the system comprising:
one or more cylinders each associated with one or more fuel injectors;
a fuel tank storing both the liquid fuel and the gaseous fuel, the fuel tank fluidly coupled to the one or more fuel injectors; and
a controller including instructions executable to:
allow the liquid fuel to be supplied to the fuel tank only if a pressure in the fuel tank is less than a threshold pressure; and
disallow the liquid fuel to be supplied to the fuel tank if the pressure in the fuel tank is greater than the threshold pressure.

2. The system of claim 1, wherein allowing the liquid fuel to be supplied to the fuel tank includes pumping the liquid fuel from a surge tank to the fuel tank via a fuel pump, the surge tank configured to store the liquid fuel and fluidly coupled to the fuel tank upstream of the fuel tank.

3. The system of claim 2, wherein the instructions are further executable to run the fuel pump after a threshold duration to reduce evaporative emissions from the surge tank.

4. The system of claim 1, wherein supply of the liquid fuel to the fuel tank is disallowed if a liquid level in the fuel tank is greater than a threshold level.

5. The system of claim 1, wherein the liquid fuel is received at a low pressure refueling port upstream of the fuel tank, the gaseous fuel is received at a high pressure refueling port upstream of the fuel tank, and the gaseous fuel is at least partially solubilized in the liquid fuel in the fuel tank.

6. The system of claim 1, wherein the instructions are further executable to depressurize the fuel tank by pumping vapor from the fuel tank to a secondary tank before allowing the liquid fuel to be supplied to the fuel tank.

7. A method, comprising:
   storing liquid gasoline having methane soluble therein;
   separating the methane from the liquid gasoline and delivering each separately to an engine cylinder; and
   enabling refueling of said liquid gasoline depending on an operating condition.

8. The method of claim 7, wherein the liquid gasoline is stored in a fuel tank, and wherein the operating condition is one of a pressure and a liquid level in the fuel tank.

\* \* \* \* \*